Patented Mar. 14, 1933

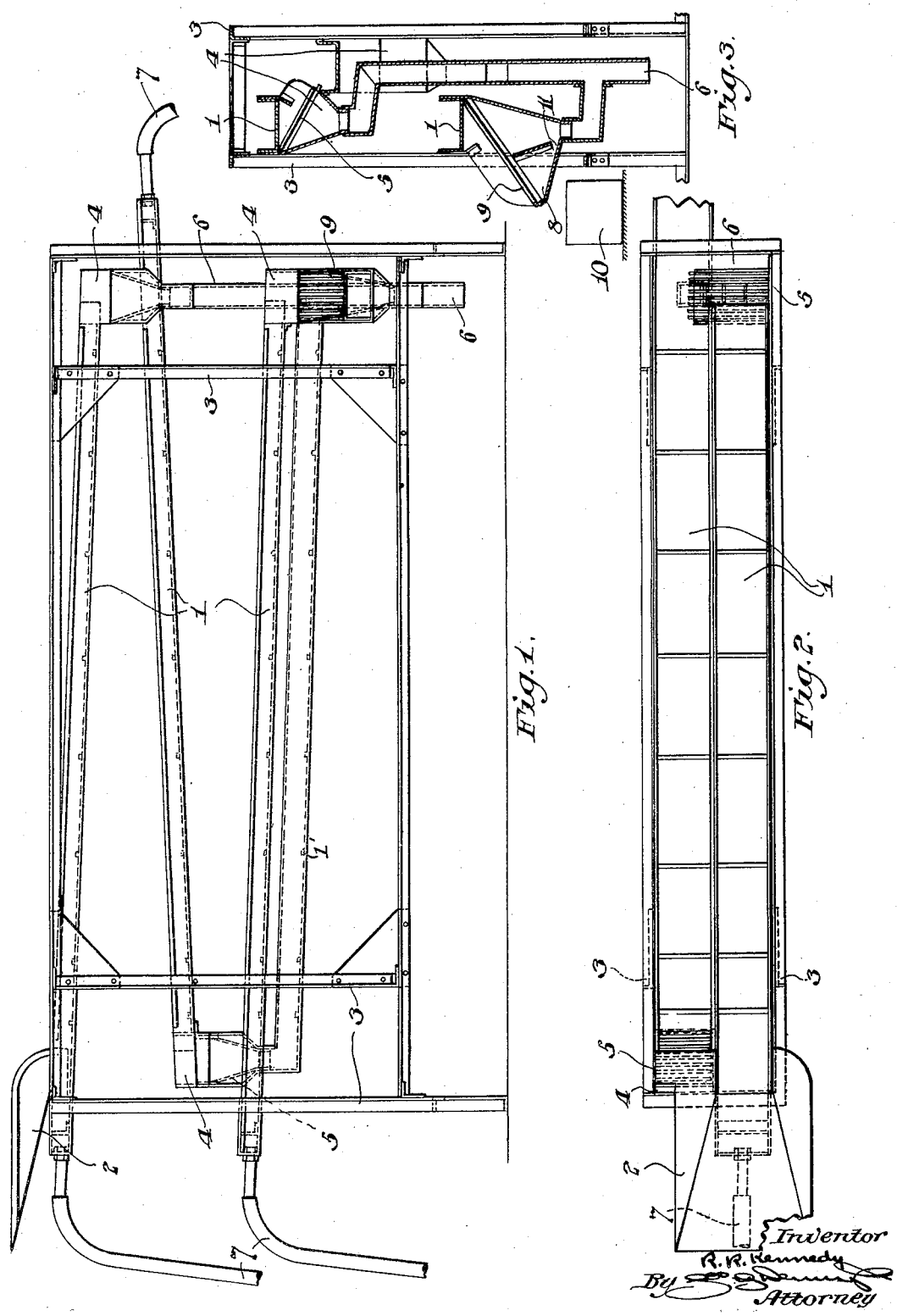

1,901,455

UNITED STATES PATENT OFFICE

RIDGWAY R. KENNEDY, OF PHILADELPHIA, PENNSYLVANIA, ASSIGNOR TO ABBOTTS DAIRIES, INC., OF PHILADELPHIA, PENNSYLVANIA, A CORPORATION

APPARATUS FOR WASHING FRUITS

Application filed November 27, 1928. Serial No. 322,117.

My invention is designed to provide an improved method of and apparatus for washing and cleaning fruits, and more particularly berries, by immersion thereof in a plurality of separate shallow streams of cleaning fluid during the flow of the fruit through a flume, preferably containing cleats forming riffles by which the rolling of the berries is facilitated; the fruit being drained of cleaning fluid and dirt accumulated therein between the immersions of the fruit in the respective streams without interfering with or delaying the travel of the fruit.

In practicing my method and using my apparatus for cleaning fruits and the like, I provide an inclined flume with water inlets and drains disposed at intervals along the length of the flume. The fruit is deposited in the flume from a hopper located at its elevated end and is washed along the flume by streams or jets of fresh water supplied through water inlets. When water from one of the inlets has washed the fruit downwardly through a portion of the flume, the contaminated water passes off through a series of rods or bars supported at their tops and forming a screened drain, the water carrying with it the dirt washed from the fruit. The fruit rolls by gravity over the screen to a lower section of the flume and is again flushed and carried along by a fresh stream of water admitted to the flume from another inlet, and is again drained as before. The fruit may be subjected to any desired number of separate washings in its travel and is ultimately discharged from the flume thoroughly cleaned and drained.

The characteristic features and advantages of my improvements will more fully appear from the following description of a preferred embodiment of my improved apparatus and the accompanying drawing in illustration thereof.

In the drawing, Fig. 1 is a side elevation of the preferred embodiment of my invention; Fig. 2 is a top plan view thereof; and Fig. 3 is a transverse sectional view through the end of the apparatus.

As illustrated in the drawing, a flume 1 is formed from a series of reversely inclined longitudinal channel sections with the hopper 2 at the elevated end of the top section; the parts being mounted on a frame 3. The reversely inclined channels are connected by flume sections having depending members forming drains or funnels 4. The tops of the funnels are covered by spaced inclined rods 5 preferably supported at the top so as to avoid entanglement of the berry stems in the screens formed by the rods. The bottoms of the funnels discharge to branches of a drain pipe 6.

Water inlets 7 are positioned along the flume between the drains and preferably at the elevated ends of the respective reversely inclined longitudinal channel sections. The flume sections preferably have spaced transverse cleats 1' fixed to the bottoms thereof which facilitate the turning or rolling of the berries by the shallow streams flowing through the flume sections and thereby jostle the berries to promote the removal of sand therefrom.

The lowermost screen has an extension 8 projecting beyond the frame above the lip 9 of the lowermost funnel and discharges into any suitable receptacle 10. A splash board 11 may be inserted in the lowermost funnel to prevent splashing of the fruit through the extension 8.

The berries or other fruit are fed from the hopper 2 into the flume 1 in a thin layer and are moved downwardly by gravity and the flow of the stream of fluid admitted through the topmost water inlet. As the berries are rolled along, a dirt is washed therefrom by the flowing stream in the top channel section. The fluid drains through the first screen 5 into the pipe 6.

The fruit rolls by gravity down the inclined surface of the screen to the next longitudinal channel section of the flume where it is washed and rolled along by the stream of fluid emitted from the second water inlet 7.

The fruit continues downward through the flume, being alternately washed and drained, until it is discharged in a clean condition into the receptacle 10.

It will be obvious that the form of the flume may be modified, as, for instance, by making it spiral and it may be provided with any desired number of fluid inlets and drains. It may also be covered or partially covered if so desired, or made of cylindrical cross section.

Having described my invention, I claim:

1. A fruit washer comprising a flume formed of a series of reversely inclined longitudinal channel sections positioned laterally in offset relation, means for supplying water to the upper end of each section, screens respectively connecting the lower end only of one section with the upper end of the next succeeding section and extending laterally, and in inclined relation relatively to the sections connected thereby, and drains below the respective screens.

2. A fruit washer comprising a flume formed of series of longitudinally inclined channel sections, means for supplying water to the upper end of each of said sections to provide separate shallow streams of cleaning fluid during the downward movement by gravity of fruit through the respective sections, each of said sections containing cleats extending transversely to the length thereof and forming riffles which facilitate the turning or rolling of fruit by gravity and by the shallow streams flowing through the flume sections and thereby jostling the fruit to promote the removal of sand therefrom, screens respectively connecting the lower end of one section with the upper end of the next succeeding section, such screens permitting the draining of cleaning fluid and dirt accumulated therein between the wettings of the fruit in the respective streams without interfering with or delaying the travel of the fruit, and drains below the respective streams.

In testimony whereof I have hereunto set my hand this seventh day of November 1928.

R. R. KENNEDY.